(12) United States Patent
Prieto et al.

(10) Patent No.: US 11,569,717 B2
(45) Date of Patent: Jan. 31, 2023

(54) AXIAL FLUX ROTARY ELECTRIC MACHINE

(71) Applicant: MOTEURS LEROY-SOMER, Angouleme (FR)

(72) Inventors: Dany Prieto, Angouleme (FR); Paul Akiki, Sceaux (FR); Xavier Jannot, Angouleme (FR); Benjamin Daguse, Massy (FR)

(73) Assignee: MOTEURS LEROY-SOMER, Angouleme (FR)

( * ) Notice: Subject to any disclaimer, the term of this patent is extended or adjusted under 35 U.S.C. 154(b) by 0 days.

(21) Appl. No.: 16/488,870

(22) PCT Filed: Feb. 14, 2018

(86) PCT No.: PCT/EP2018/053635
§ 371 (c)(1),
(2) Date: Aug. 26, 2019

(87) PCT Pub. No.: WO2018/153738
PCT Pub. Date: Aug. 30, 2018

(65) Prior Publication Data
US 2019/0386549 A1    Dec. 19, 2019

(30) Foreign Application Priority Data

Feb. 24, 2017    (FR) ...................................... 1751473

(51) Int. Cl.
*H02K 16/02*        (2006.01)
*H02K 1/24*         (2006.01)
*H02K 1/2793*       (2022.01)

(52) U.S. Cl.
CPC ............. *H02K 16/02* (2013.01); *H02K 1/246* (2013.01); *H02K 1/2793* (2013.01)

(58) Field of Classification Search
CPC ........... H02K 16/02; H02K 1/246; H02K 1/24
USPC ........................................................ 310/114
See application file for complete search history.

(56) References Cited

U.S. PATENT DOCUMENTS

| 6,833,647 | B2 | 12/2004 | Saint-Michel et al. |
| 8,674,525 | B2 | 3/2014 | Van Den Bossche et al. |
| 2006/0131986 | A1* | 6/2006 | Hsu ........................ H02K 21/24 310/268 |

(Continued)

FOREIGN PATENT DOCUMENTS

| CN | 103904796 A | 7/2014 |
| CN | 103915921 A | 7/2014 |

(Continued)

OTHER PUBLICATIONS

May 14, 2018 International Search Report issued in International Patent Application No. PCT/EP2018/053635.

(Continued)

*Primary Examiner* — Terrance L Kenerly
(74) *Attorney, Agent, or Firm* — Oliff PLC (57) ABSTRACT

An axial flux rotary electric machine including at least one stator and at least one rotor that are arranged along an axis of rotation of the machine, the rotor including a rotor mass and housings created in the rotor mass, the housings defining magnetic poles of the rotor, each of the housings being able to contain or not contain at least one permanent magnet.

17 Claims, 6 Drawing Sheets

(56) References Cited

U.S. PATENT DOCUMENTS

| | | | |
|---|---|---|---|
| 2009/0309461 A1* | 12/2009 | Berenger | H02K 19/38 |
| | | | 310/67 R |
| 2011/0260566 A1 | 10/2011 | Odvarka et al. | |
| 2012/0146445 A1 | 6/2012 | Tokoi et al. | |
| 2013/0049512 A1 | 2/2013 | Jung | |
| 2013/0285483 A1 | 10/2013 | Lee et al. | |
| 2014/0042852 A1 | 2/2014 | Lee et al. | |
| 2014/0292117 A1 | 10/2014 | Lee | |
| 2015/0380995 A1* | 12/2015 | Mochida | H02K 1/2746 |
| | | | 310/156.53 |

FOREIGN PATENT DOCUMENTS

| | | |
|---|---|---|
| EP | 2 523 311 A1 | 11/2012 |
| EP | 3 082 236 A1 | 10/2016 |
| WO | 96/29774 A1 | 9/1996 |
| WO | 2015/039220 A1 | 3/2015 |

OTHER PUBLICATIONS

Jan. 14, 2021 Office Action issued in Chinese Patent Application No. 201880013703.4.

* cited by examiner

AXIAL FLUX ROTARY ELECTRIC MACHINE

The present invention relates to the field of rotary electric machines, and more particularly to that of axial flux rotary electric machines.

"Axial flux" means that the flux flowing in the machine is oriented, in the air gap created between the rotor and the stator, in a direction parallel to an axis of rotation of the machine, in contrast to a so-called radial flux machine, in which the flux flows between the rotor and the stator in a direction perpendicular to the axis of rotation of the machine.

The invention relates more particularly to synchronous reluctance machines, also termed synchro-reluctant machines. A reluctance machine is a machine configured to obtain high saliency in each pole of the machine so as to have a machine with high saliency torque. The term "saliency of a pole" means that the reluctance varies along the pole in the air gap during the rotation of the rotor.

Axial flux permanent magnet machines are known, for example from documents U.S. Pat. No. 8,674,525, US 2012/0146445, US 2013/0285483, US 2014/0042852 or US 2014/0292117. These machines comprise two rotors on which the magnets are surface-mounted. These machines have no saliency.

US 2013/0049512, for example, also discloses other topologies, having more stators than rotors and having the drawback of consisting of stator yokes which can give rise to iron losses. In these machines, the rotor also comprises surface-mounted magnets.

Other machines, known for example from patent U.S. Pat. No. 6,833,647 or from application US 2011/0260566, operate on the principle of concentration of flux at the rotor, and thus have low saliency. The arrangement of the magnets serves to concentrate the magnetic flux and also to create a slight saliency.

In WO 96/29774, the machine comprises two stators and a flux concentration rotor, the two stators comprising teeth that are outwardly salient. In this machine, the rotor is slightly salient.

In known rotors, in order to obtain sufficient induction levels in the air gap and to have compact machines, it may be necessary to use magnets that have a high energy density and are thus expensive. Specifically, such magnets are manufactured with rare earths.

In other machines, use is made of magnets having low energy per unit volume, which are made of ferrite, but such machines have the drawback of requiring a high polarity or rotors with a very large diameter in order to obtain levels of induction in the air gap that are comparable with those that may be obtained with magnets having high energy per unit volume. A high polarity machine requires high frequencies and hence significant losses in the motor in the form of iron losses and in the inverter in the form of switching losses. Such machines having a high polarity and having magnets with a low energy density are thus used at limited speeds.

Thus, the rotors of such rotary electric machines do not make it possible to provide machines having a relatively low polarity, for example less than 12, preferably less than 8 or even 6, with effective use of the magnets, in particular magnets made of ferrite and/or with a low energy density, or even with no permanent magnets.

Therefore, there is a need to benefit from a rotary electric machine with which it is possible to avoid the use of magnets, or which allows more effective use of the magnets, in particular magnets made of ferrite and/or with a low energy density, and possibly with a polarity which is not necessarily high.

The invention relates to alternators as well as motors.

The invention aims to respond to this need and therefore relates, according to one of its aspects, to an axial flux rotary electric machine, comprising at least one stator and at least one rotor that are arranged along an axis of rotation X of the machine, the rotor comprising a rotor mass and housings created in the rotor mass, these housings being in particular in the form of slots, the housings defining magnetic poles of the rotor, each of said housings being able to contain or not contain at least one permanent magnet.

The expression "arranged along an axis of rotation of the machine" means that, when moving along the axis of rotation of the machine, one encounters first one of the stator and the rotor, then the other of the stator and the rotor. The stator(s) and rotor(s) of the machine are thus arranged in succession along the axis of rotation of the machine, and not concentrically, as is the case in radial flux machines.

The machine according to the invention, which is a synchronous reluctance axial flux machine, with or without permanent magnets, makes it possible to obtain considerably higher saliency than in the prior art machines, and to minimize, even to remove the need to use permanent magnets.

The axial orientation of the machine according to the invention makes it possible to reduce the space requirements of the machine and improve its compactness. The surface of the air gap between the rotor and the stator being larger results in better electrical conversion. Indeed, in the case of an axial flux machine, the surface of the air gap is weakly linked to the length of the stator and of the rotor. The machine can therefore be less bulky.

In the invention, the structure of the machine permits efficient use of the obtained saliency torque while conserving any torque resulting from the permanent magnets. The obtained total torque is that resulting both from the permanent magnets, if used, and from the saliency of the machine.

Thus, the machine according to the invention makes it possible to make use of the saliency torque in addition to the torque resulting from the permanent magnets. Thus, for constant total torque, the torque due to the magnets is less, and therefore it is possible to use a smaller quantity of permanent magnets, or to use magnets having lower energy density.

Another advantage of the invention is that, for a given quantity and a given type of permanent magnets, the obtained total torque is greater owing to the torque due to the saliency, which is added to the torque due to the permanent magnets to obtain the total torque.

Rotor

The rotor may comprise a magnetic rotor mass comprising the housings which can receive the permanent magnets, if present, and a shaft extending along an axis of rotation, on which the rotor mass is arranged. This shaft is secured to the rotor or rotors, and is mounted by means of at least one bearing, for example one or two bearings, on a casing of the machine, in particular one or two end flange(s) of the machine.

The shaft may be made of a magnetic material, advantageously making it possible to reduce the risk of saturation in the rotor mass and to improve the electromagnetic performance of the rotor. The shaft may comprise a magnetic sleeve in contact with the rotor mass, the sleeve being mounted on a magnetic or non-magnetic spindle.

As a variant, the rotor may comprise a non-magnetic shaft on which the rotor mass is arranged. The shaft may for example be made, at least in part, of a material from the following non-limiting list: non-magnetic steel, stainless steel, titanium or any other non-magnetic material. The rotor mass may, in one embodiment, be arranged directly on the non-magnetic shaft, for example without an intermediate rim. As a variant, in particular when the shaft is not non-magnetic, the rotor may comprise a rim that surrounds the shaft of the rotor and bears against the latter.

The magnetic rotor mass may be made entirely or in part with magnetic laminations.

The magnetic rotor mass may be made entirely or in part using one or more solid magnetic materials, for example chosen from the following non-limiting list: gray cast iron, spheroidal-graphite cast iron, SMCs (soft magnetic composites), amorphous magnetic materials, cast steel, forged steel.

The magnetic rotor mass may be made entirely or in part of an isotropic material, such as magnetic powders joined together by sintering or adhesive bonding, or by addition of metal using methods known as 3D printing.

The rotor mass extends along the axis of rotation of the machine and is arranged around the shaft. The shaft may comprise torque transmitting means for driving the rotor mass in rotation.

The housings according to the invention are created entirely in the rotor mass. The rotor may have no polar parts that would be arranged between two consecutive magnets of opposite polarity, their polarity being oriented in a plane perpendicular to the axis of rotation of the machine.

The total number of possible housings and magnets of the machine depends on the polarity of the rotor. The rotor mass may comprise any number of housings, for example between 4 and 96 housings, better still between 8 and 40 housings, or even between 16 and 32 housings. The number of housings per pole of the rotor may for example be between 1 and 12 housings, better still between 2 and 10 housings, or even between 3 and 8 housings per pole of the rotor.

The magnets may be embedded in the rotor mass. In other words, the magnets are covered by the rotor mass at the air gap. The surface of the rotor at the air gap may be defined entirely by the edge of the rotor mass and not by the magnets. In that case, the housings have no outward opening in the axial direction.

The housings may be filled at least partially with a non-magnetic synthetic material. This material may fix the magnets in place in the housings and/or increase the cohesion of the rotor mass.

If necessary, the rotor mass may comprise one or more reliefs that help to position the magnets properly, in particular in the radial direction.

The rotor may or may not be mounted with an overhang.

Magnets

The machine may have no permanent magnets. In that case, the rotary electric machine according to the invention is said to be a pure synchro-reluctance machine. The housings of the rotor may then be empty or contain one or more non-magnetic parts.

As a variant, the machine may comprise housings comprising one or more permanent magnets. The permanent magnets, if present, may be made at least in part of ferrite, rare earths, AlNiCo or any other hard magnetic material.

The permanent magnets may in particular be made at least partially of ferrite. It is possible for example for them to not contain rare earths, or at the very least to contain less than 50% by mass of rare earths. The arrangement of the housings receiving the magnets makes it possible to concentrate the flux of the magnets and to obtain advantageous performance with ferrite magnets.

The polarity of the magnets may be oriented in an axis parallel to the axis of rotation of the machine.

By virtue of the arrangement of the magnets in the rotor mass, sufficient levels of induction are obtained in the air gap, even with relatively low polarity of the rotor, for example less than or equal to 6, while using not necessarily magnets having high energy per unit volume, such as magnets made of rare earths, but, by contrast, magnets having low energy per unit volume, for example those made of ferrite. This makes it possible to reduce the cost of the rotor. Moreover, the polarity of the rotor may be reduced if required by the application. Specifically, the rotor according to the invention makes it possible to increase the level of induction in the air gap without increasing the polarity and by using low energy density magnets.

The permanent magnets may be oriented radially, along a radius of the machine, and/or axially, perpendicular to the longitudinal axis of the machine. In one embodiment, all of the housings of the rotor may comprise permanent magnets.

In another variant, the rotor of the machine may comprise housings having no permanent magnets and others comprising one or more permanent magnets. In one embodiment, a given magnetic pole of the machine can be defined by housings comprising permanent magnets and housings having no permanent magnet. All of the magnetic poles of the machine can be defined in this way.

In another exemplary embodiment, the machine may comprise magnetic poles which differ from one another in at least one of the following aspects: the arrangement of the housings, the shape of the latter, the number thereof to form a pole, whether or not they are filled with permanent magnets and/or non-magnetic parts.

By way of example, the rotor of the machine may comprise a first magnetic pole and a second magnetic pole adjacent to the first magnetic pole, the first and second magnetic poles being of different polarity, housings belonging to the first magnetic pole having no permanent magnets and housings belonging to the second magnetic pole comprising one or more permanent magnets.

In any case, a housing having no permanent magnet can be at least partially filled with one or more non-magnetic parts.

In one embodiment, wedges can be inserted into one or more housings so as to be able to hold or separate the permanent magnets or the above-mentioned non-magnetic parts. These wedges can themselves be non-magnetic.

The permanent magnets may have a rectangular shape in cross section. As a variant, the magnets may have a curved cross section, for example in the form of a ring sector. The permanent magnets may have a thickness e of between 4 and 20 mm. The magnet or magnets of a second housing may have the same thickness as the magnets of another, first housing, or, as a variant, have a different thickness.

Housings

The housings of the rotor may be oriented radially, essentially along a radius of the machine, and/or axially, perpendicular to the longitudinal axis of the machine. They may be U-shaped or V-shaped when seen in a plane of section that contains the axis of rotation of the machine. The Us or Vs are oriented toward the air gap. The phrase "U or V oriented toward the air gap" means that the U or V is open in the direction of the air gap. Each lateral branch of a U or V may contain a single permanent magnet. As a variant, each lateral branch of a U or V contains more than one permanent magnet, in particular two magnets that form, for example, each branch of the U or V. Such segmentation of the magnets may make it possible to improve the circulation of the flux in the rotor mass and/or to introduce bridges so as to stiffen the latter.

In one embodiment, a magnetic pole of the rotor may be defined by at least one housing whose general shape is a cylinder, a cylinder of revolution, conical or frustoconical.

In this case, the housing or housings may form an angle, with a radial axis of the corresponding pole, of for example between 0 and 45°, preferably less than 30°.

The general shape of the housing may be cylindrical.

The general shape of the cylindrical housing, when observed in a plane perpendicular to the axis of rotation of the machine, may be annular, in particular circular, square, triangular, rectangular, or any other geometric shape, or also comprising two slots that converge toward the axis of rotation of the machine.

A magnetic pole of the rotor may be defined by a housing. As a variant, a magnetic pole of the rotor may be defined by a plurality of housings that are cylindrical and concentric with one another, in particular between two and seven concentric housings, for example three concentric housings.

A housing having the general shape of a cylinder of revolution may comprise a bottom part. In other words, the housing thus has the general shape of a pot, it being possible for the perimeter of the bottom part to have a generally circular, square, triangular or even rectangular shape.

The machine may have no magnets arranged at the surface of the magnetic rotor mass. As a variant, the machine may comprise at least one permanent magnet arranged at the surface of the magnetic rotor mass.

The shape of the housing in section parallel to the longitudinal axis X may be chosen so as to optimize the induction waveform in the air gap. By way of example, at least one end of the housing may have a rectangular, triangular or curved shape in section parallel to the longitudinal axis X. The two ends are, as the case may be, rectangular, triangular or curved in shape.

When the magnet is fitted in the corresponding housing, the part or parts of the housing without a magnet at (one of) its ends may be in the form of a right-angled triangle or curve.

The rotor may comprise permanent magnets fitted in all or some of the housings, for example in at least half the housings, or in more than two-thirds of the housings, or even in all the housings.

Stator

The stator may comprise teeth and windings arranged on the teeth. The stator may have concentrated winding, that is to say wound on teeth, with each winding surrounding one tooth, and each tooth bearing one winding. The winding of the stator is multiphase. The number of phases may be at least 3, being for example equal to 3, or greater than 3, for example 5, 7, 11, 13, or 17, or even more.

As a variant, the stator may have distributed winding. When the stator has distributed winding, the number of teeth and notches per pole and per phase may be between 2 and 9 teeth, for example 3 teeth per pole and per phase.

The electric conductors of the windings of the stator may be arranged in the corresponding winding either "randomly" or otherwise in an "ordered" manner. The windings may take the form of distributed coils, for example distributed over multiple levels, with any even number of layers. A configuration of this kind may be favorable for reducing the harmonics of space linked to the distribution of the windings, as is often done in machines having conventional topologies.

The electrical conductors of the windings of the stator may be produced with wires of circular, or oblong, cross section, the conductor then being called "flat wire". The wires used may be insulated at low voltage, being enameled or even enameled and covered, or at medium voltage, being insulated by mica paper for example, or even at very high voltage, being for example produced with high-voltage cable.

The cooling of the windings may be produced by the gas contained in the machine, for example air, by forced convection for example, or not, or, as a variant, by a liquid circulating in pipe coils included appropriately in the windings, even in the wires themselves of the windings, which may then be produced with hollow electrical conductors.

The stator may have no yoke, or as a variant may have a yoke. The stator may comprise between 6 and 48 teeth, for example 12 teeth in one embodiment. The stator may comprise at least 6 teeth, for example 6, 12 or 18 teeth, or even more.

The windings of the stator are preferably each wound about a winding axis parallel to the axis of rotation of the machine. The windings may comprise wires made of copper or aluminum, or any other electrically conductive material.

The teeth of the stator may each have an essentially prismatic general shape, in particular comprising, in cross section considered perpendicularly to the axis of rotation of the machine, two concentric circle portions that are connected by two radii, or as a variant two linear portions connected by two radii. The larger portion of the two linear or partially circular portions may be located toward the outside of the machine. As another variant, the teeth of the stator may have another shape, being for example rectangular. The axial length of one tooth of the stator, measured along the axis of rotation of the machine, may be greater than the axial length of a winding measured along the axis of rotation of the machine.

The windings of the stator may be of corresponding shape. The teeth of the stator have a front face which faces the rotor. Said faces are preferably planar and extend perpendicular to the axis of rotation of the machine.

The teeth of the stator may be attached to an annular stator armature. The teeth may be made in one piece with this annular stator armature, or as a variant may be held thereon by any means such as adhesive bonding, welding, screwing, assembling, for example by means of dovetail joints, this list being non-limiting.

The teeth may be formed of a stack of laminations, held securely together by any means such as adhesive bonding, snap-fitting, riveting, and attached to the annular stator armature for example by means of screws. The laminations may be stacked along a radial parallel stacking axis, this stacking access being perpendicular to the axis of rotation of the machine. The size of the laminations used in the stack increases with increasing distance from the axis of rotation of the machine. The cutting of the teeth in the stack of laminations may be designed so as to reduce material losses. It is for example done with the teeth oriented head-to-tail, so as to avoid drops. For equivalent cost, it is possible to use, for the production of the teeth, a more costly magnetic material, for example one that is of better quality and has better performance.

The teeth may also be made of an isotropic material, such as magnetic powders joined together by sintering or adhesive bonding, amorphous magnetic materials, or by addition of metal using methods known as 3D printing.

The annular stator armature is preferably non-magnetic. It is for example made of aluminum. Thus, the stator may have no magnetic yoke, which is less costly. As a variant, the annular stator armature is not non-magnetic.

The windings may be wound onto a support that is designed to be itself threaded onto the corresponding tooth. This support is preferably made of electrically insulating material, for example plastic material.

The machine may comprise a single stator and a single rotor.

As a variant, the machine may comprise at least two rotors arranged on either side of the stator along the axis of rotation X of the machine. The two rotors surrounding the stator may or may not be angularly offset with respect to one another.

In one embodiment, there may be no angular offset between the two rotors. The two rotors may be symmetric with respect to a plane perpendicular to the axis of rotation of the machine.

The teeth of the stator may each bear two windings arranged on the corresponding tooth on either side of the annular stator armature, each one of these two windings facing one of the two rotors. The teeth of the stator may in particular be attached by their middle to said annular stator armature. The two resulting half-teeth may be of the same size, just like the windings which they bear.

The stator may be symmetric with respect to a plane perpendicular to the axis of rotation of the machine.

In another variant embodiment, the machine may comprise two stators and a central rotor. In yet another variant, the machine may comprise multiple stators and multiple rotors, as described below.

Machine

The machine may be a synchronous motor or a synchronous generator.

The machine according to the invention may be a motor. In the case of a motor, the number of poles of the machine may be at least 4, being for example 4, 6, 8 or 12. One of the advantages of a machine of this kind is its compactness.

As a variant, the machine may also be a generator. In this case, it may for example comprise 4 or 6 poles. In one variant embodiment, the machine comprises for example 4 poles and 6 teeth.

The ventilation of the machine may be forced, by drawing air into the machine. The air can be drawn in via the middle of the machine, in particular when it comprises two rotors arranged on either side of the stator.

The invention also relates to a rotary electric machine comprising multiple assemblies as described above, each consisting in particular of a stator and two rotors, all arranged on a common axis of rotation. A machine of this kind comprises, for example, two assemblies each consisting in particular of a stator and two rotors, or even more, for example three or four assemblies, or even more, depending on the desired electrical or mechanical power.

The invention relates in particular to a machine comprising three assemblies according to the invention, each consisting in particular of a stator and two rotors arranged on a common axis of rotation, in which the windings of the stators are three-phase, with one phase per stator.

DETAILED DESCRIPTION

The invention will be better understood from reading the following detailed description of non-limiting exemplary embodiments thereof and from studying the appended drawing, in which.

FIGS. 1 to 3 and 5 to 7 show a rotary electric machine 10 according to the invention, comprising a stator 20 and two rotors 40 that are respectively arranged on either side of the stator 20 along the axis of rotation X of the machine.

The stator comprises teeth 21 and windings 22 arranged on the teeth 21. As shown in particular in FIG. 2, the windings 22 are each wound around a winding axis Y parallel to the axis of rotation X of the machine.

The teeth 21 of the stator 20 each comprise a face 23 facing one of the two rotors 40. The faces 23 are planar and extend perpendicular to the axis of rotation X of the machine. In the example described, the stator comprises 12 teeth, but could comprise 6 or 8, or more. The stator is symmetric with respect to a stator median plane perpendicular to the axis of rotation X of the machine. The stator 20 has no yoke.

The teeth 21 are configured such that they extend beyond the windings by a distance d.

Figure 3:
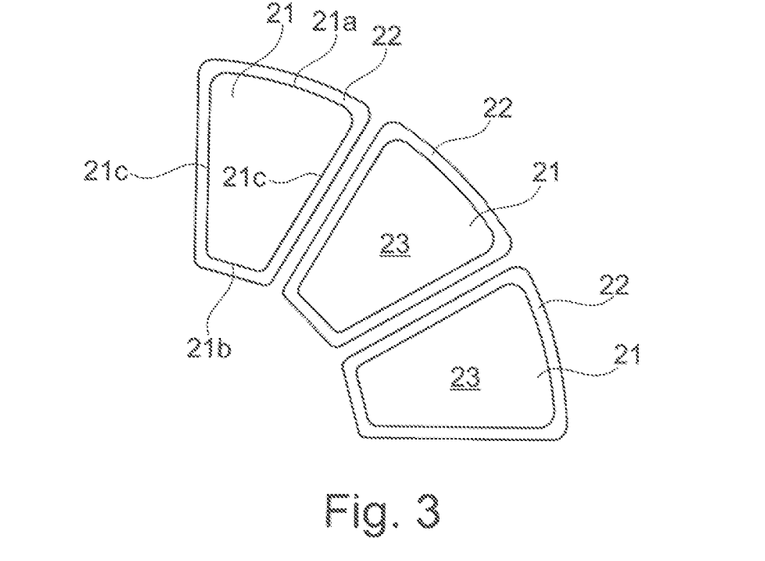
FIG. 3 is a schematic and partial detail view, along the axis of rotation X, of the stator of FIG. 1.

The teeth 21 are bounded, when seen along the axis X, by two portions 21a and 21b which are connected by two radii 21c, as shown in FIG. 3. The windings 22 are of corresponding shape.

Figure 4:
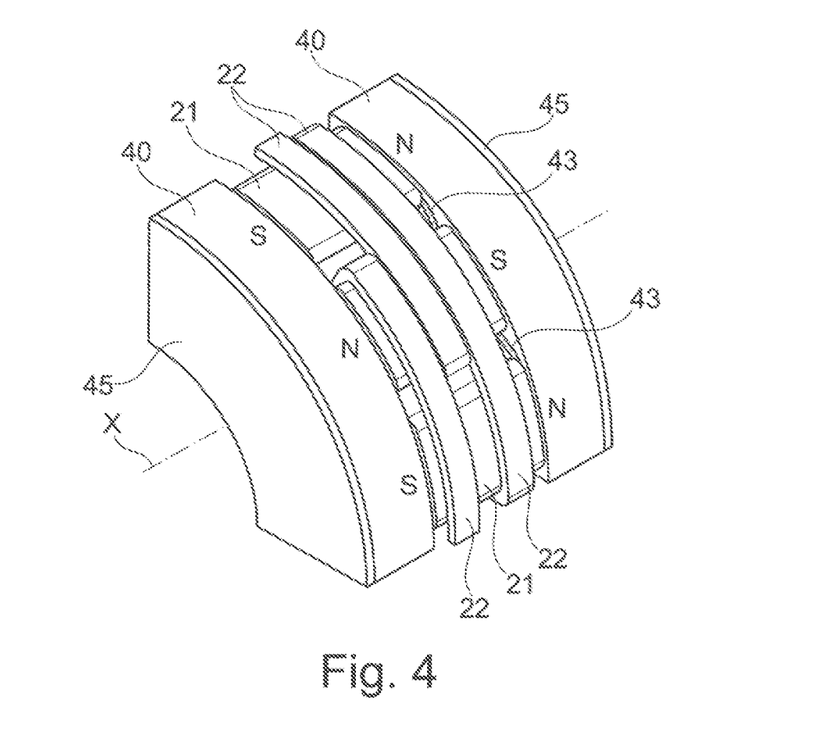
FIG. 4 is a view similar to FIG. 2 of a variant embodiment, with a distributed-winding stator.

In the example just described, the stator has concentrated winding. If this is not the case, this does not represent a departure from the scope of the present invention. The stator may for example have distributed winding, as illustrated in FIG. 4. In this exemplary embodiment, the number of teeth and notches per pole and per phase is 3.

In the example described, the two rotors surrounding the stator are arranged face-to-face, not being angularly offset with respect to one another. The rotors might also be angularly offset with respect to one another, in particular in order to minimize torque fluctuations.

Figure 1:
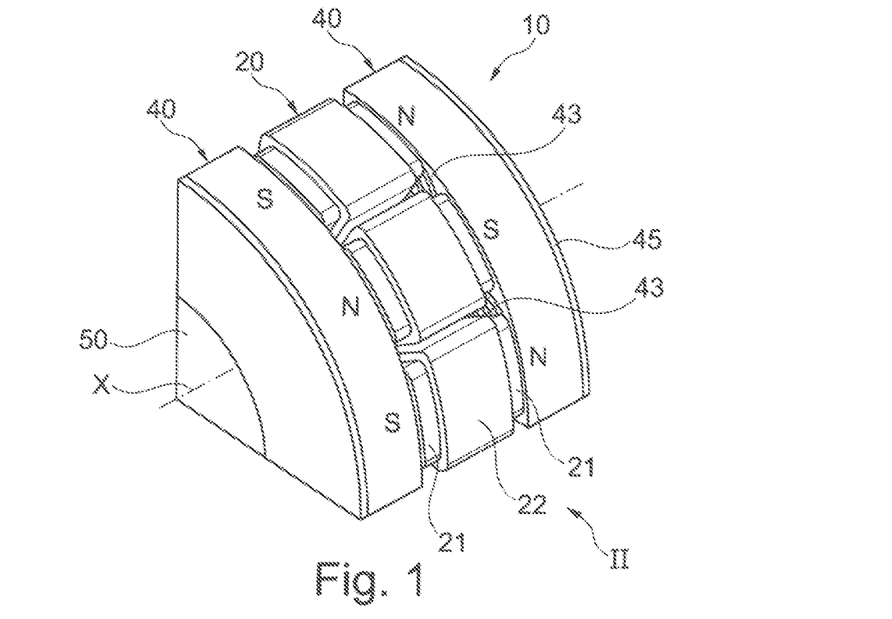
FIG. 1 is a schematic and partial perspective view of a machine created in accordance with the invention.
Figure 2:
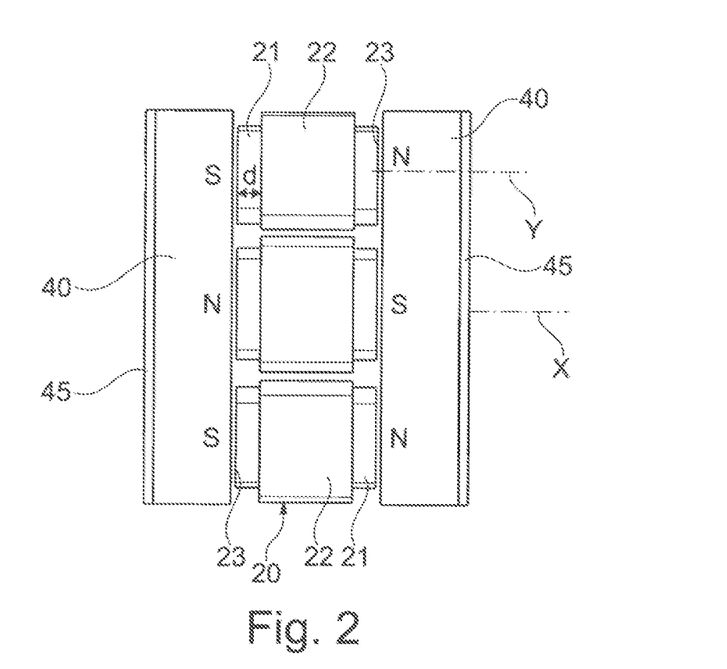
FIG. 2 is a view thereof along the arrow II.

Each one of the two rotors 40 comprises a magnetic rotor mass 41 comprising housings 42, which can receive permanent magnets 43 if these are present, and a shaft 50 extending along the axis of rotation X, on which is arranged the rotor mass 41, as illustrated in FIG. 1.

Figure 5:
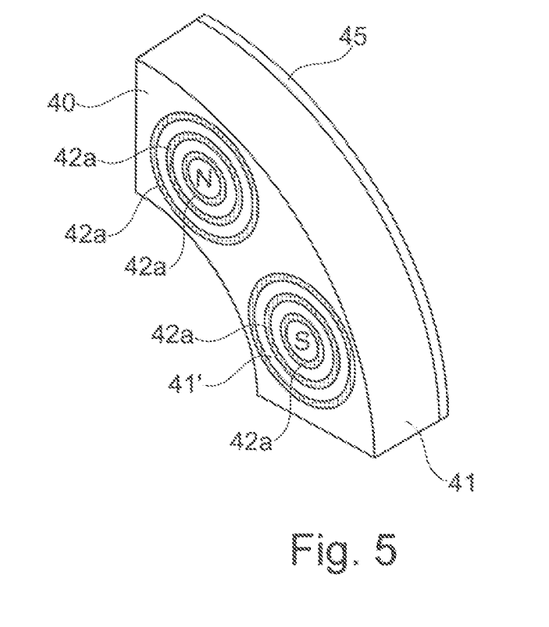
FIG. 5 is a schematic and partial perspective view of the rotor of FIG. 1.
Figure 6:
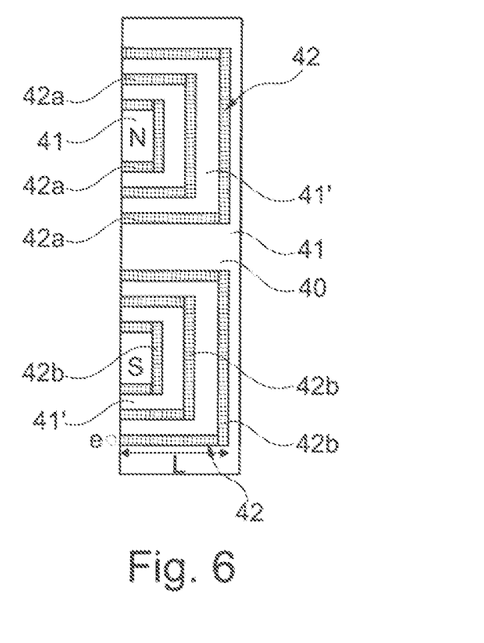
FIG. 6 is a view thereof in section parallel to the axis of rotation X.
Figure 7:
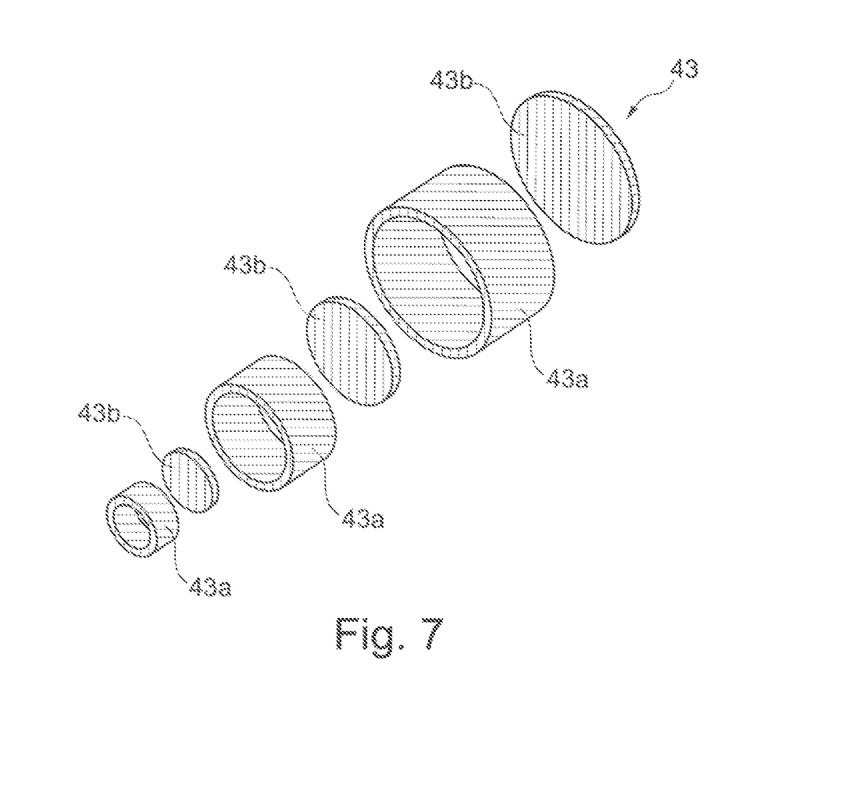
FIG. 7 is an exploded perspective view of the magnets of a pole of the rotor.

Housings 42 of a rotor define a magnetic pole of the rotor. As illustrated in FIGS. 5 to 7, a magnetic pole of the rotor is defined by housings having the general shape of a cylinder of revolution, in particular three mutually concentric cylindrical housings. Each housing comprises a cylindrical part 42a and a discoidal bottom part 42b. In other words, the housing therefore has the general shape of a pot. In this case, the magnetic mass 41 of the rotor may comprise magnetic parts 41' which are not secured to the rest of the magnetic mass, and which are arranged between the various housings of a given pole.

Thus, a housing extends over a length L measured along the axis of rotation of the machine, and may have a thickness e.

In the example described, all of the housings 42 are filled with permanent magnets 43, as illustrated. The permanent magnets of a magnetic pole of the rotor comprise a tubular portion 43a accommodated in the cylindrical part 42a of a housing 42, and a discoidal part 43b accommodated in the discoidal bottom part 42b of the housing 42.

Each one of the rotors 40 further comprises a yoke 45 on the opposite side from the air gap.

In the example which has just been described, the housings have a generally circular shape when viewed in a plane perpendicular to the axis of rotation of the machine. If this is not the case, this does not represent a departure from the scope of the present invention.

Figure 8A:
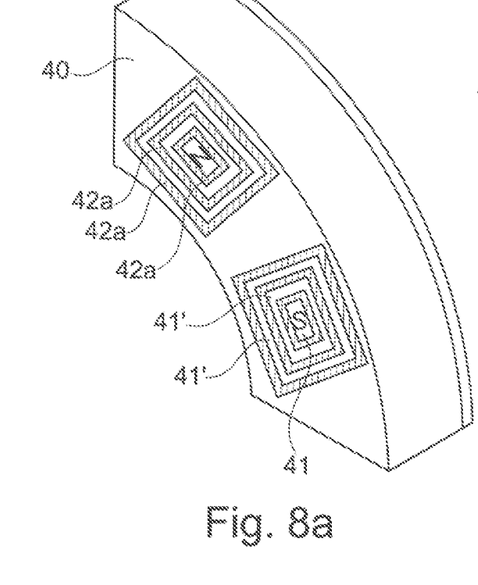
FIGS. 8a to 8c are views similar to FIG. 5, of variant embodiments.
Figure 8B:
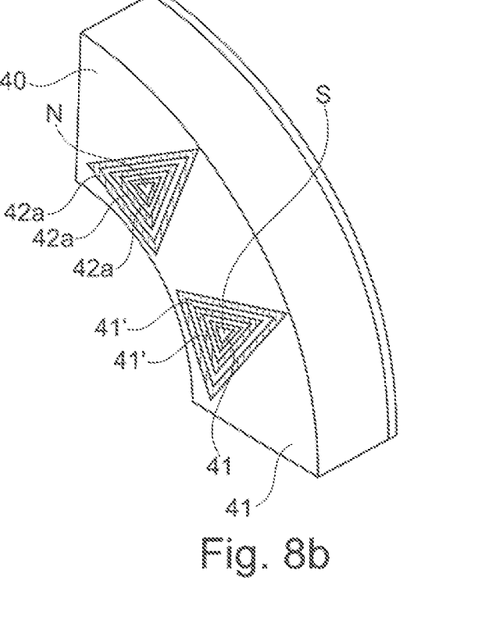
Figure 8C:
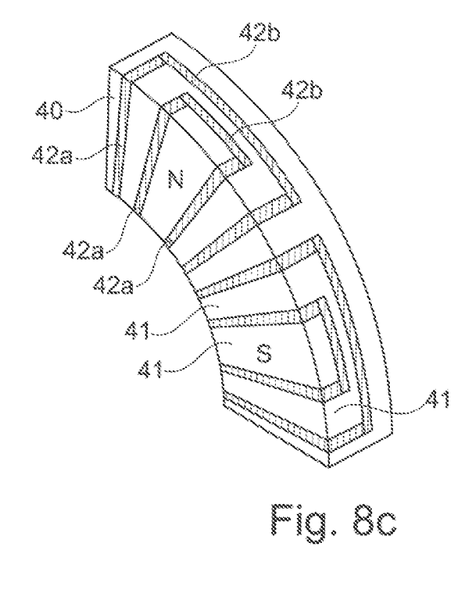

The housings may for example have a different general shape when viewed in a plane perpendicular to the axis of rotation of the machine, for example square as illustrated in FIG. 8a, triangular as illustrated in FIG. 8b, or also comprising two slots that converge toward the axis of rotation of the machine as illustrated in FIG. 8c. FIG. 8c shows that the housings are U-shaped when viewed perpendicular to the axis of rotation of the machine. The Us are oriented toward the air gap.

Figure 9:
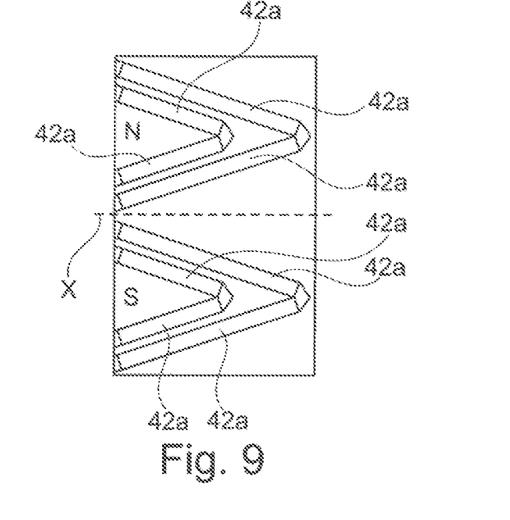
FIG. 9 is a view similar to FIG. 6 of a variant embodiment.

In another variant, the housings may be V shaped when viewed in a plane of section that contains the axis of rotation X, as illustrated in FIG. 9. The Vs are also oriented toward the air gap.

Figures 10A, 10B:
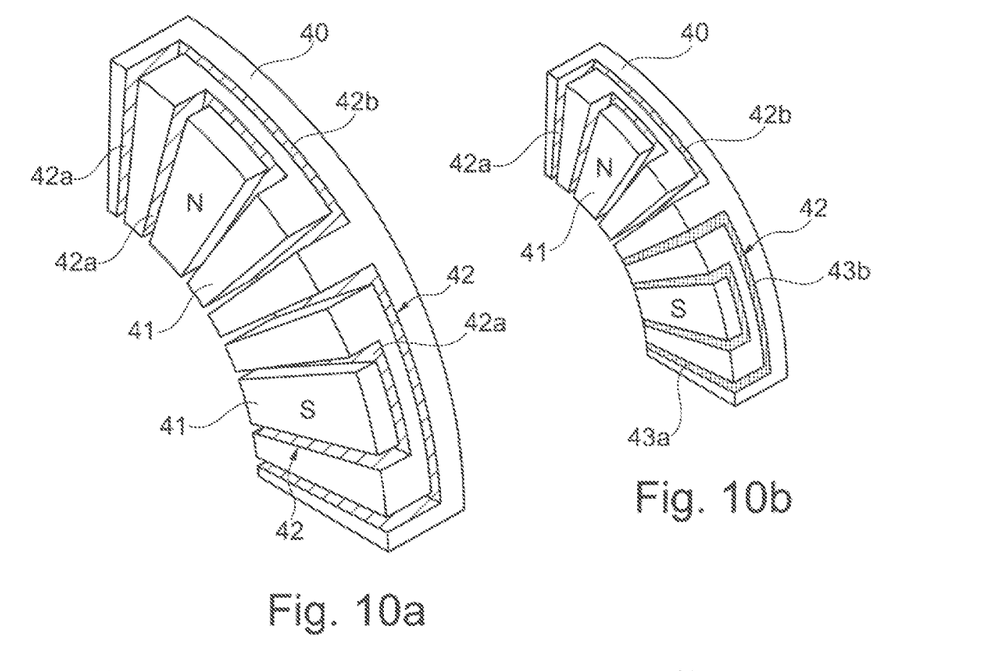
FIGS. 10a, 10b, 11 to 13 are views similar to FIG. 5, of variant embodiments.

In all of the described examples, the housings 42 are filled with permanent magnets 43. If the housings have no permanent magnets, this does not represent a departure from the scope of the present invention. By way of example, FIG. 10a shows such an exemplary embodiment in which none of the housings 42 has a magnet, and FIG. 10b shows an exemplary embodiment in which the rotor comprises a first magnetic pole and a second magnetic pole adjacent to the first magnetic pole, the first and second magnetic poles being of different polarity, housings belonging to the first magnetic pole having no permanent magnets and housings belonging to the second magnetic pole comprising one or more permanent magnets.

Figure 11:
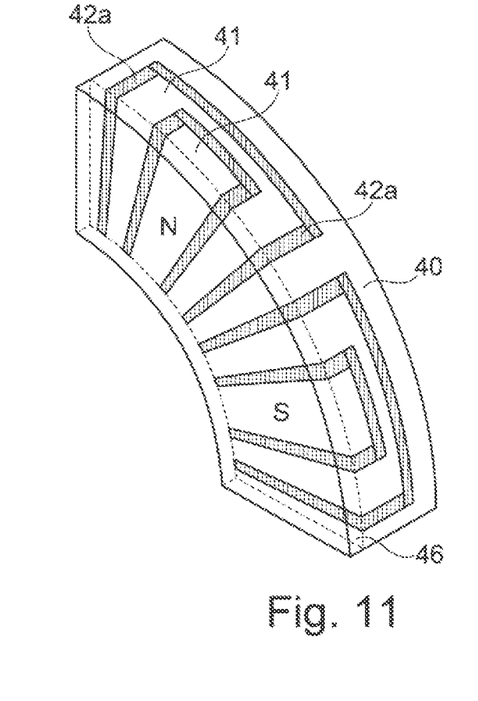
Figure 12:
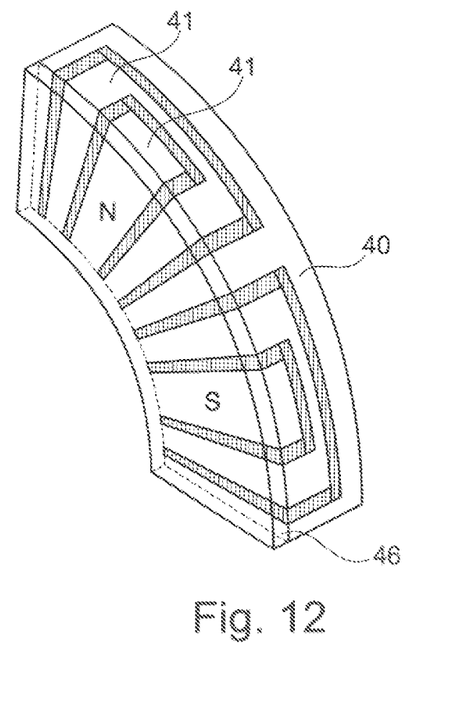

In all of the described examples, the housings 42 are open toward the air gap. If this is not the case, and if the housings are closed on the side of the air gap by a magnetic covering portion 46 which may be formed in one piece with the rest of the magnetic rotor mass, as illustrated in FIG. 11, or attached thereto, as illustrated in FIG. 12, and held for example by adhesive bonding, this does not represent a departure from the scope of the present invention. The magnetic covering portion 46 may be made of the same material as the magnetic rotor mass, or of a different material. This magnetic covering portion then constitutes a tangential bridge, at the air gap, for the circulation of the magnetic flux.

Figure 13:
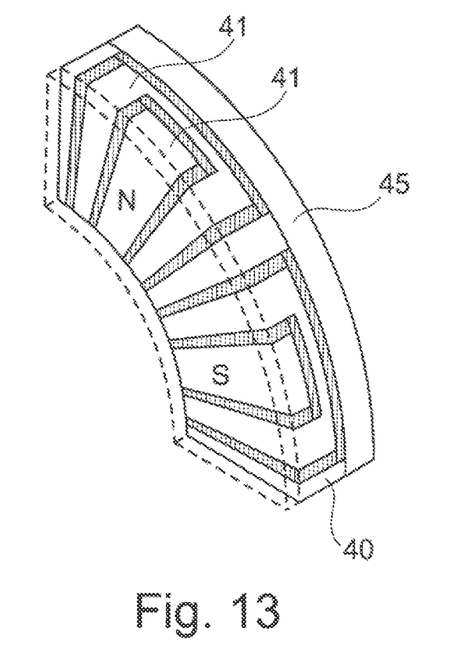

The embodiment of FIG. 13 illustrates the possibility of creating the yoke 45 of the rotor not in one piece with the magnetic mass 41, but affixed thereto, for example by adhesive bonding. A configuration of this kind permits access to the housings 42 from the outside, so as to easily insert the magnets 43 therein from the external face of the rotor.

Figure 14:
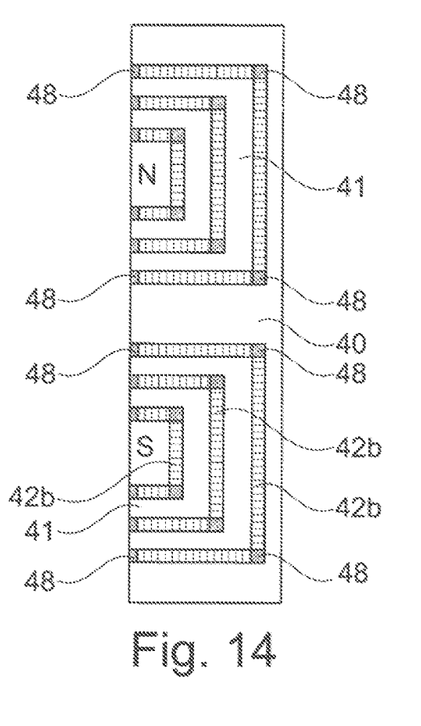
FIG. 14 is a view similar to FIG. 6 of another variant embodiment.

Finally, FIG. 14 illustrates the possibility of inserting, into the housings 42, wedges 48 which may for example serve to hold or separate the permanent magnets. These wedges can themselves be non-magnetic.

Of course, the invention is not limited to the exemplary embodiments which have just been described.

It is in particular possible to increase the number of stators or rotors.

The expression "comprising a" should be understood as a synonym for "comprising at least one".

The invention claimed is:

1. An axial flux rotary electric machine, comprising at least one stator and at least one rotor that are arranged along an axis of rotation of the machine, the rotor comprising a rotor mass and receptacles created in the rotor mass, the receptacles defining magnetic poles of the rotor, each of said receptacles being able to contain or not contain at least one permanent magnet,
   wherein the receptacles are open toward an air gap between the rotor and the stator, and
   wherein the receptacles are U-shaped when viewed perpendicular to the axis of rotation of the machine.

2. The machine as claimed in claim 1, having no permanent magnets.

3. The machine as claimed in claim 1, the rotor comprising receptacles having no permanent magnets and others comprising one or more permanent magnets.

4. The machine as claimed in claim 3, in which the rotor comprises a first magnetic pole and a second magnetic pole adjacent to the first magnetic pole, the first and second magnetic poles being of different polarity, receptacles belonging to the first magnetic pole having no permanent magnets and receptacles belonging to the second magnetic pole comprising one or more permanent magnets.

5. The machine as claimed in claim 1, a magnetic pole of the rotor being defined by a receptacle or a plurality of receptacles that are cylindrical and concentric with one another.

6. The machine as claimed in claim 1, the stator comprising teeth and windings arranged on the teeth.

7. The rotary electric machine as claimed in claim 6, in which the teeth of the stator each have an essentially prismatic general shape.

8. The rotary electric machine as claimed in claim 7, comprising, in cross section considered perpendicularly to the axis of rotation of the machine, two concentric circle portions that are connected by two radii, or two linear portions connected by two radii.

9. The machine as claimed in claim 7, the teeth of the stator each bearing two windings arranged on the corresponding tooth on either side of the annular stator armature, each one of these two windings facing one of the two rotors.

10. The machine as claimed in claim 1, comprising at least two rotors arranged on either side of the stator along the axis of rotation of the machine.

11. The machine as claimed in claim 1, constituting a motor.

12. The machine as claimed in claim 1, constituting a generator.

13. The machine as claimed in claim 1, in which a magnetic pole of the rotor is defined by at least one receptacle whose general shape is a cylinder, a cylinder of revolution, conical or frustoconical.

14. The machine as claimed in claim 13, in which the general shape of the cylindrical receptacle, when observed in a plane perpendicular to the axis of rotation of the machine, is annular, circular, square, triangular, rectangular or also comprising two slots that converge toward the axis of rotation of the machine.

15. The machine as claimed in claim 13, in which a receptacle having the general shape of a cylinder of revolution comprises a bottom part.

16. An axial flux rotary electric machine, comprising:
at least one stator and at least one rotor that are arranged along an axis of rotation of the machine, the rotor comprising a rotor mass and receptacles created in the rotor mass, the receptacles defining magnetic poles of the rotor, each of said receptacles being able to contain or not contain at least one permanent magnet, and
one or more permanent magnets contained in one or more of the receptacles,
wherein the permanent magnets are oriented radially, along a radius of the machine, or are oriented radially, along a radius of the machine and axially, perpendicular to the longitudinal axis of the machine, and
wherein the receptacles are U-shaped when viewed perpendicular to the axis of rotation of the machine.

17. An axial flux rotary electric machine, comprising at least one stator and at least one rotor that are arranged along an axis of rotation of the machine, the rotor comprising a rotor mass and receptacles created in the rotor mass, the receptacles defining magnetic poles of the rotor, each of said receptacles being able to contain or not contain at least one permanent magnet,
wherein a magnetic pole of the rotor is defined by at least one receptacle whose general shape is a cylinder, a cylinder of revolution, conical or frustoconical,
wherein the rotor comprises receptacles having no permanent magnets and receptacles comprising one or more permanent magnets, and
wherein the receptacles are U-shaped when viewed perpendicular to the axis of rotation of the machine.

* * * * *